United States Patent
Aslanidis et al.

[19]
[11] Patent Number: 5,948,116
[45] Date of Patent: *Sep. 7, 1999

[54] BIT ERROR CORRECTION ALGORITHM

[75] Inventors: Konstantin O. Aslanidis; Andreas Hagl, both of Dachau, Germany

[73] Assignee: Texas Instruments Deutschland, GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/605,990

[22] Filed: Feb. 23, 1996

[51] Int. Cl.$^6$ ............................ H04L 1/00; H04L 1/08
[52] U.S. Cl. ...................... 714/746; 714/797; 714/822
[58] Field of Search ........................ 371/30, 37.9, 36; 714/746, 797, 822

[56] References Cited

U.S. PATENT DOCUMENTS

| | | | |
|---|---|---|---|
| 3,863,215 | 1/1975 | McGrogan, Jr. | 371/69.1 |
| 4,241,311 | 12/1980 | Massey | 327/45 |
| 4,312,074 | 1/1982 | Pautler et al. | 375/96 |
| 4,965,884 | 10/1990 | Okura et al. | 375/106 |
| 5,018,142 | 5/1991 | Simcoe et al. | 370/112 |
| 5,105,447 | 4/1992 | Iwane | 375/360 |

*Primary Examiner*—Stephen M. Baker
*Attorney, Agent, or Firm*—Rebecca Mapstone Lake; Richard L. Donaldson

[57] ABSTRACT

A corrected digital response signal is generated from a corrupted transponder response signal by receiving the response signal an odd number of times, greater than one, and sampling each received response signal a predetermined number of times. Then, the sample values from each transponder response signal are compared to one another and a majority sample value is obtained. The majority sample value is the value ordained by the majority and therefore represents the corrected response signal value. Alternatively, if time does not permit reception of more than one transponder response signal, additional response signals may be generated from the originally received response signal by shifting the received response by a predetermined number of samples to the right and by shifting the received response by a predetermined number of samples to the left to generate second and third response signals. Then, as similarly described, the first second and third signals are compared sample by sample with the majority sample value yielding the corrected sample value. In this way, a corrected response signal is generated.

17 Claims, 3 Drawing Sheets

BIT ERROR CORRECTION ALGORITHM

FIELD OF THE INVENTION

This invention relates in general to digital data transfers and more specifically to a method for preventing bit errors in digital data transfers.

BACKGROUND OF THE INVENTION

Many Radio Frequency Identification (RF-ID) applications require the use of a multitude of transponders in any given interrogation read range. For example, manufacturing applications of RF-ID systems, where thousands of items must be tracked, thousands of transponders are located throughout the warehouse. Therefore, the more large an area within which transponders are to be read, the higher the probability that some kind of noise will interfere with the transponder response signal, thereby making identification of the tracked part ineffective.

In addition, in many industrial applications, where different electrical or electronic devices are located nearby transponders to be read, the devices may generate different kinds of noise. Under these environmental conditions, RF-ID systems are especially adversely affected by the generated noise. White noise or low level noise is always existing from lights, or any other continuously running electronic mechanisms i.e. refrigerators, computers etc., but is generally compensated for in the robustness of the system. Another kind of noise generated by these nearby electronic devices are voltage spikes, in the air or on AC lines, generated by the switching on and off of the different electronic devices. Under these conditions, the ID system does not receive valid data from the transponders because a few bits of the transponder response signal are partly corrupted by a spike although the rest of the response signal is uncorrupted. This kind of noise may deteriorate the performance of the system up to 20–30 percent of the ideal performance.

SUMMARY OF THE INVENTION

Assuming that the probability that the same bit, within a transponder response signal, of different transponder response signals is corrupted is low, one possible solution to the above-mentioned problem is to sample the incoming data ten times a bit for more than one transponder response signal i.e. three response signals. The received samples are then compared sample by sample and whichever sample value, either a one or a zero, is within the majority (two out of three) becomes the bit of choice, thereby reconstructing the corrected telegram. In a more time constrained circumstance where time permits only a single read, and assuming that the probability that the same bit, within a transponder response signal, is always corrupted is low, the same solution exists but with one response signal. Three response signals are generated from the originally received transponder response signal by shifting the original response signal by a predetermined number of samples to the right and then shifting the original response signal by a predetermined number of samples to the left, yielding the originally received response, the right shifted response and the left shifted response. Then the same comparison described above is performed sample by sample on these response signals with the majority sample value resulting in the corrected transponder response. In this way, a corrected transponder response signal is generated.

One advantage achieved by this invention is an increase in the noise immunity of an RF-ID system.

A second advantage achieved by this invention is the increase in the reliability of the system, i.e. less error messages received and better efficiency in the interrogation/response protocol.

A third advantage this invention offers to RF-ID systems is that implementation of this invention is compatible with existing RF-ID system components.

A fourth advantage this invention offers to digital data systems is that this solution is a real time solution, with results evidencing improvements in system performance immediately.

BRIEF DESCRIPTION OF THE DRAWINGS

The invention will be explained in greater detail with reference to an example of an embodiment shown in the drawings, in which.

DETAILED DESCRIPTION OF PREFERRED EMBODIMENTS

Figure 3:
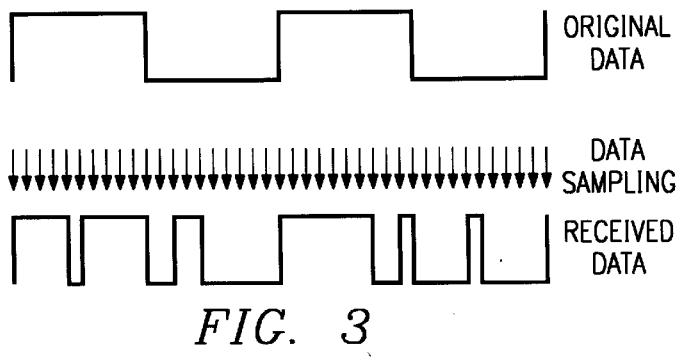
FIG. 3 is a timing diagram showing the data sampling of the data bits which takes place according to a preferred embodiment of this invention.

The problem of corrupted data transmissions is solved according to this invention in that the incoming data is sampled for example, 10 times a bit, as shown in FIG. 3, for the same transponder response signal, more than once i.e. three times. Then the corresponding received samples are compared to one another, sample by sample, and the sample value which is in a majority becomes the correct sample value which makes up the corrected bit thereby reconstructing the corrected response signal.

Figure 1:
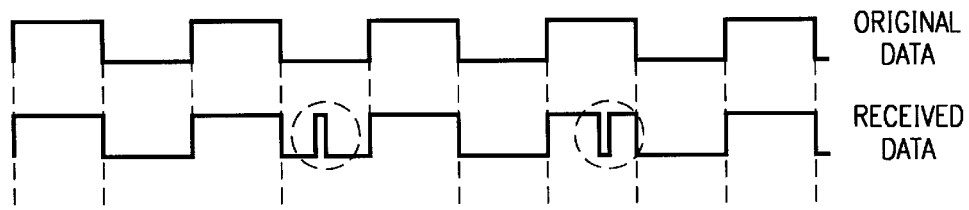
FIG. 1 is a timing diagram showing an uncorrupted data stream and a data stream corrupted by noise spikes.
Figure 2:
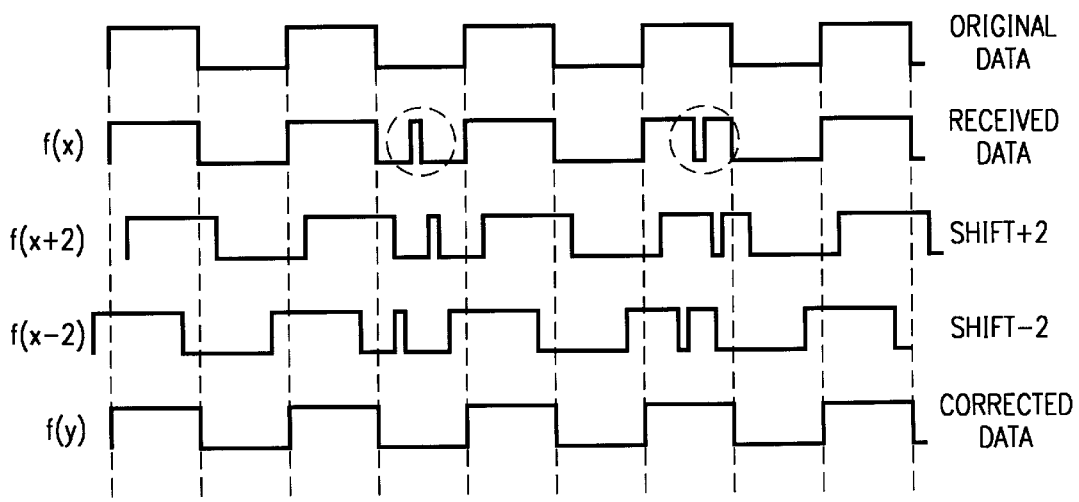
FIG. 2 is a timing diagram showing implementation of a preferred embodiment according to this invention on a corrupted data stream.
Figure 5:
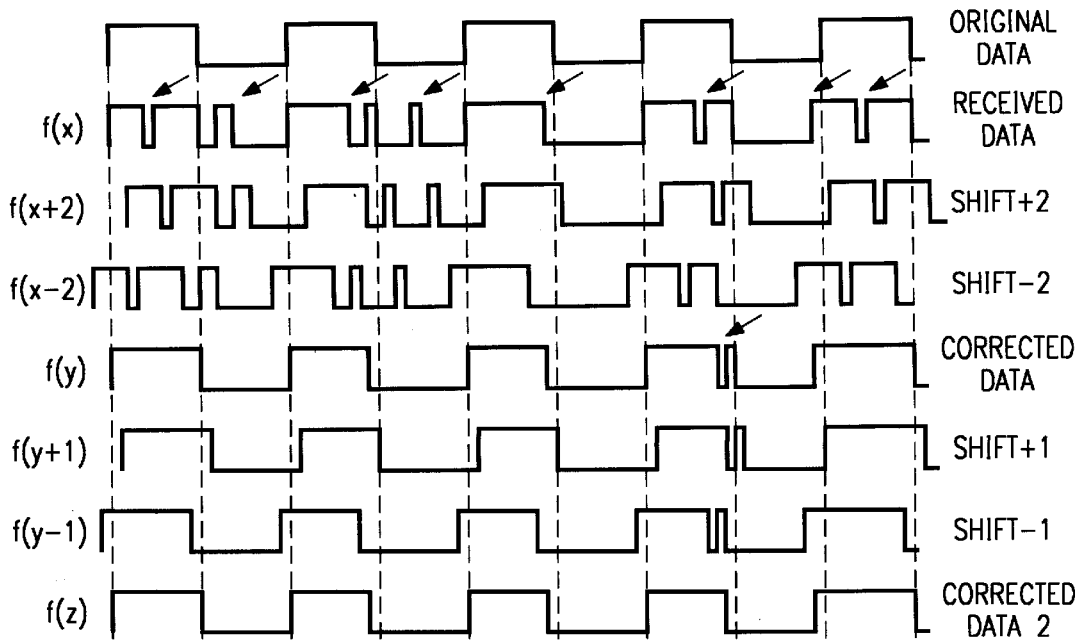
FIG. 5 is a timing diagram showing implementation of a preferred embodiment according to the invention on another corrupted data stream.

In the situation wherein only one read is possible within a predetermined time frame because of the nature of the application, i.e. toll tag applications, three transponder response signals can be generated out of one received response signal. The original response signal is the first response signal f(x), then the original response signal f(x) is shifted by w, where w is the number of samples to be shifted, e.g. two samples to the right f(x+2) to generate a second response signal and the original response signal f(x) is shifted by w, e.g. 2 samples to the left f(x−2) to generate a third response signal as shown in FIGS. 2 and 5. The comparison of the corresponding samples and the majority decision generates a new correct (spike free) response signal.

Figure 4:
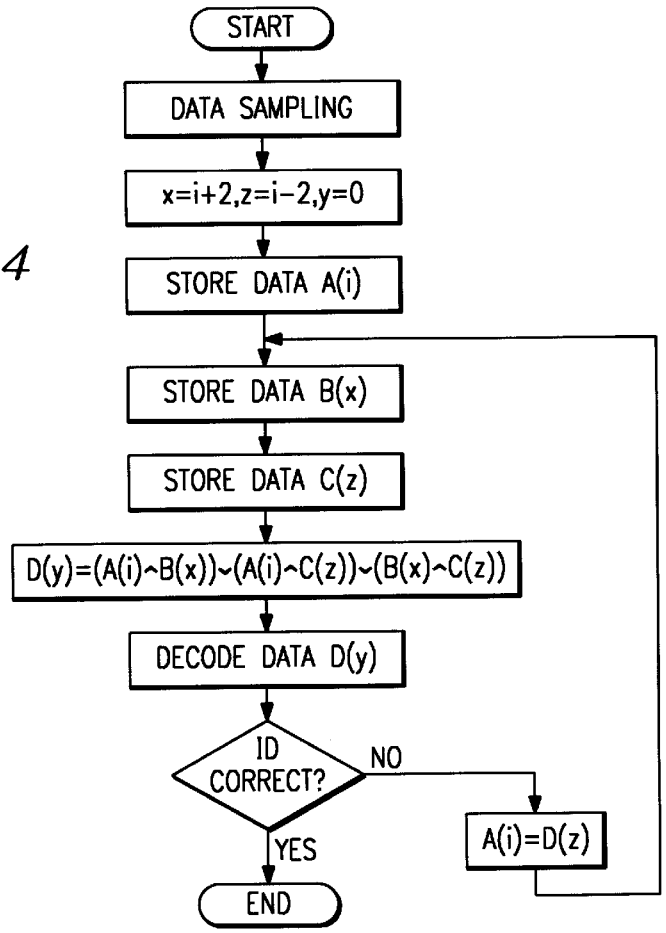
FIG. 4 is a flow chart of implementation of a preferred embodiment according to the invention for a single read error correction.

The flow chart of the procedure to generate a corrected response signal with a single read is shown in FIG. 4. The start function signifies the system generating a system interrupt to start the read cycle. This can be realized by a button on a reader or via a software generated interrupt i.e. put the reader into a continuous read mode. During the receive phase of the system indicated by the sampling function, the incoming data will be sampled and the samples will be stored as a function of A(i). The store data function indicates the parameter initialization (i.e. x=i+2, z=i−2) and functions, B(x), data shifted by two samples to the right, and C(z), data shifted two samples to the left, are generated, thereby generating three datastreams. After processing the data according to the described algorithm, where the corresponding samples are compared one to the other and the sample value which comes up most often(i.e. the best two out of three) is the final value of the reconstructed response signal, a new datastream is created, D(y). The function D(y) should be the corrected response signal. The next step generates the real bits out of the samples and then the integrity of the data is proved using Cyclic Redundancy Checking (CRC).

Cyclic Redundancy Checking is performed by adding an additional block of bits to each transponder response data stream. This additional block of data bits is calculated by applying a specific algorithm to the response data bits to yield a transponder specific CRC. During the manufacturing of the transponder, both the unique identification number of the transponder and the CRC will be programmed into the transponder. Then, during the receive phase, both the transponder response signal and the transmitted CRC are received by the reader/interrogator. The reader calculates from the received response data, the new CRC using the same CRC algorithm. A comparison of the two, received and newly calculated CRC's provides evidence as to the validity of the data i.e. if both CRC's are equal, then the received data are valid, and if the CRC's are not equal, then the received data are not valid. If the data are not valid as indicated by the CRC, then the algorithm can be applied against the same three generated data streams. If the corrected response signal is determined invalid by the CRC, the corrected response signal may be sampled and then compared against the first A(i) and second B(x) response signals in the same manner as described above with reference to FIG. 4. Generating a majority sample value among the three sample values compared results in a more corrected value of the sample within the corrected response signal.

In another preferred embodiment according to the invention, in the case where, because of the nature of the application, more than one transponder response signal reads within a predetermined time frame are possible, then the comparison and the generation of a new corrected response signal can be done out of e.g. the same response signal transmitted three times. In accordance with the above procedure, the three response signals are compared to one another, sample by sample, and the predominant sample value is the sample of choice and bit by bit, a corrected response signal is generated. Once a corrected signal has been generated, the validity of the data is checked via a CRC generator. If the data is invalid, then the single read algorithm described above is applied, yielding a more corrected response signal.

Figure 6:
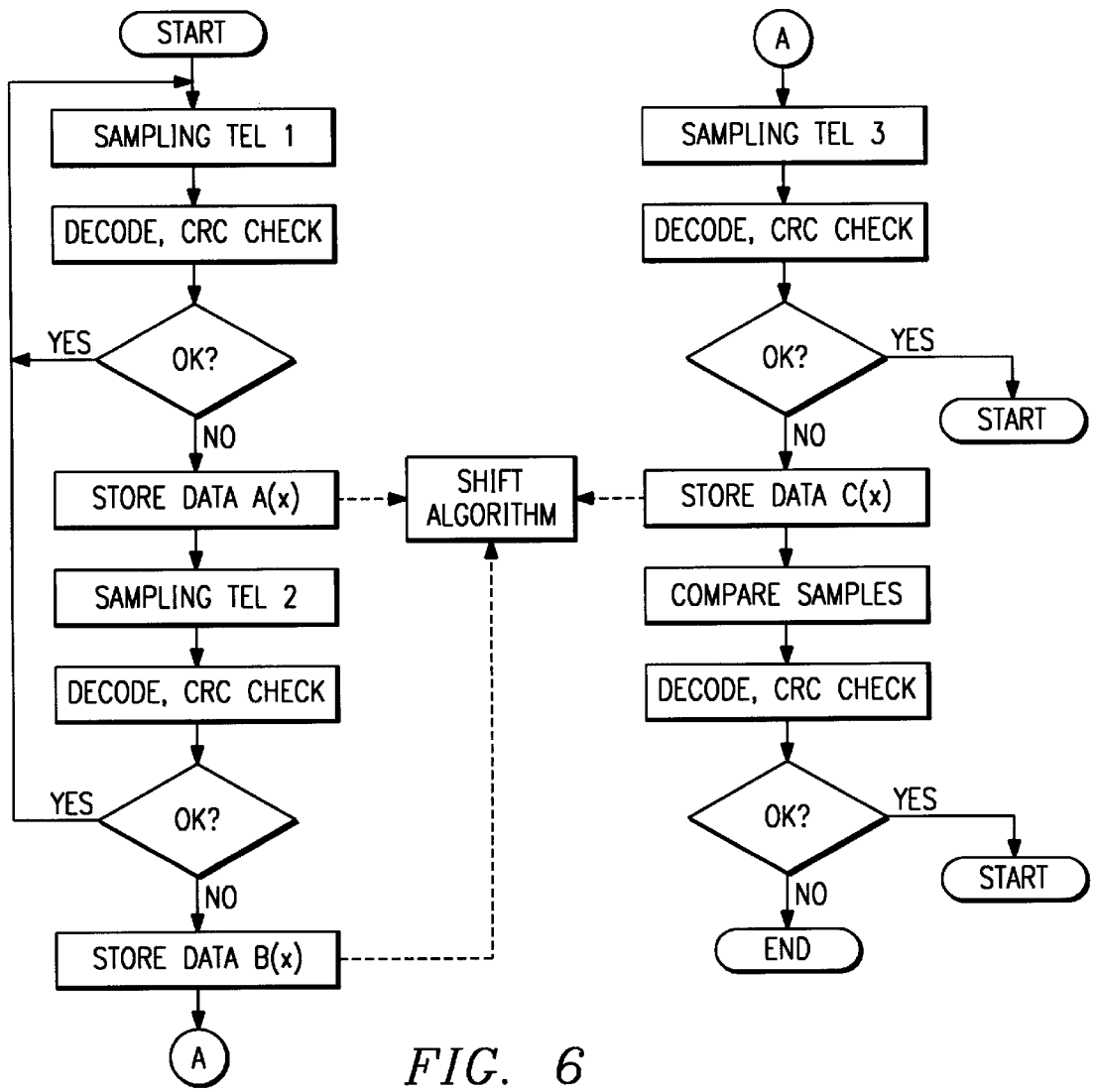
FIG. 6 is a flow chart depicting implementation of a preferred embodiment according to the invention for a multi read error correction.

FIG. 6 depicts a flow chart for a second preferred embodiment wherein more than one transponder response signal is received within the allotted read time frame. Like in the single read solution, the start function signifies the system generating a system interrupt to start the read cycle. This can be realized by a button on a reader or via a software generated interrupt i.e. put the reader into a continuous read mode. Then the first response signal is sampled, the data is decoded and then validated via the CRC. If the data is not valid, then the samples are stored in A(x). Then the single read error correction algorithm described above and shown in FIG. 4 is applied and if the result is still not valid, then move on to step two. In step two, the same procedure used for the first response signal is used for the second received response signal. In other words, the second received response signal is sampled, decoded and the validity of the data is verified by CRC. If the data is invalid, the samples are stored in B(x), the single read error correction algorithm as shown in FIG. 4 is applied and if the data is still invalid, proceed to step three. Alternatively to applying the standard single read error correction algorithm shown in FIG. 4, i.e. shifting the received signal to the left and right by two samples to generate a total of three datastreams to be compared, B(x) may be compared against two of the three datastreams generated with respect to the first received response signal, i.e. the first received signal and the received signal shifted two samples. Then the rest of the flow shown in FIG. 4 is the same. The potential number of different combinations only grows with each additional received response signal thus increasing the potential to remove the voltage spikes most efficiently.

Step three is step two performed with the third received response signal. The third received response signal is sampled, decoded and the validity of the data is verified by CRC. If the data is invalid, the samples are stored in C(x), and the single read error correction algorithm as shown in FIG. 4 is applied. If the data is still invalid, proceed to step four and if the data is valid, return to step one. Step four includes applying the single error correction algorithm to the three stored datastreams, A(x), B(x), and C(x). After processing the data according to the described algorithm, where the samples are compared one to the other and the sample value which comes up most often(i.e. the best two out of three) is the final value of the reconstructed response signal, a new datastream is created, D(y). The function D(y) should be the corrected response signal. The next step generates the real bits out of the samples and then the integrity of the data is proved using Cyclic Redundancy Checking (CRC). If both CRC's are equal, then the received data are valid, and if the CRC's are not equal, then the received data are not valid. If the data is not valid as indicated by the CRC, then the algorithm can be applied against a new response signal and then process is begun again. The entire procedure can be continued for an even higher number of read cycles, but if the data is repeatably invalid, the system resets itself and starts again from step 1. Alternatively to storing the received response signals in A(x), B(x) and C(x), the results of applying the single error correction algorithm to the received response signals may be stored.

A slightly different flow than that depicted by FIG. 6 is as follows. Upon receipt of the first, second and third response signals, instead of decoding and validating the data via the CRC, apply the shift algorithm of FIG. 4 to, for example, the first response signal and thereby generate a first corrected response signal, A(x). This first corrected response signal is then validated by the CRC. If the first corrected response signal is invalid, apply the shift algorithm to the second response signal, generate a second corrected signal, B(x), and check the validity of the second corrected response signal via the CRC. If the second corrected response signal is invalid, apply the shift algorithm to the third response signal, generate a third corrected response signal, C(x), and then check the validity of the third corrected response signal via the CRC. If the third corrected response signal is invalid, then apply the shift algorithm to A(x), B(x) and C(x) as the three signals to be compared. Generating a majority sample among the three sample values compared results in a more corrected value of the sample within the corrected response signal.

FIG. 5 shows the timing diagrams of an original data stream transmitted by the responder and then the datastream as received by the reader, f(x), corrupted by voltage spikes. Then the timing diagrams for the received datastream shifted to the left two samples and then shifted to the right two samples, and upon applying the error correction algorithm a much more correct datastream results as shown in the timing diagram of f(y). Then f(y) is shifted one sample to the left and one sample to the right and the error correction algorithm is applied again. This time yielding a spike-free response datastream, f(z), which is the corrected response datastream.

Figure 7:
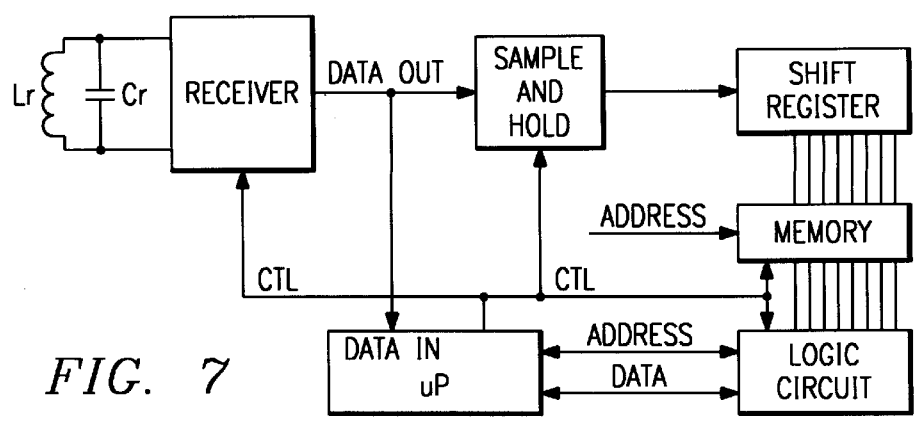
FIG. 7 is a block diagram of a possible hardware implementation of a preferred embodiment according to the invention.

The preferred embodiments described above may be implemented in hardware or software and neither implementation is intended to be outside the scope of this invention. An example of a hardware implementation of a preferred embodiment of the invention is shown in the block diagram of FIG. 7. A few embodiments have been described in detail herein above. It is to be understood that the scope of the invention also comprehends embodiments different from those described, yet within the scope of the invention.

I claim:

1. A method for generating a corrected response signal from a corrupted digital response signal comprising the steps of:

receiving a corrupted first response signal comprising at least data;

sampling said first response signal at a predetermined sampling rate yielding a sampling value per sample;

generating a second and a third response signal by shifting said first response signal a predetermined number of samples to the right and by shifting said first response signal a predetermined number of samples to the left respectively;

comparing a sample value of said first response signal to the value of the corresponding sample of said second and third response signal;

determining the corrected value of said sample by a majority decision between said corresponding sample values of said first, second and third response signals, thereby generating a corrected response signal.

2. A method according to claim 1, further comprising:

storing said second and third generated response signals subsequent to generation of said second and third response signals; and sampling said second and third generated response signals at a predetermined sampling rate before comparing corresponding samples.

3. A method according to claim 1, further comprising:

checking said corrected response signal via a CRC generator to determine the validity of said corrected response signal data;

sampling said corrected response signal at a predetermined sampling rate, yielding a sample value per sample, in response to the data being determined invalid;

generating a second and a third corrected response signal by shifting said corrected response signal a predetermined number of samples to the right and by shifting said corrected response signal a predetermined number of samples to the left respectively;

comparing said sample values of said first corrected response signal to corresponding sample values of said second and third corrected response signals;

determining the corrected value of said sample by a majority decision between said first, second and third corrected response signal samples, thereby generating a more corrected response signal.

4. A method according to claim 3, wherein the predetermined number of samples said corrected response signal is shifted is less than the predetermined number of samples said first response signal is shifted.

5. A method according to claim 3 wherein said CRC generator applies a standard CCITT algorithm.

6. A method according to claim 1, wherein the predetermined sampling rate is 10 times a bit of data.

7. A method according to claim 1, wherein the predetermined number of samples said first response signal is shifted is two samples.

8. A method for generating a corrected response signal from a corrupted digital response signal comprising the steps of:

receiving first, second and third response signals, wherein said first, second and third response signals are the same response signal transmitted three times;

sampling said first, second and third response signal at a predetermined sampling rate, yielding a sample value per sample;

comparing the value of the corresponding sample of the first signal to the value of the corresponding sample of said second response signal and to the value of the corresponding sample of the third response signal;

generating a majority sample value among the three sample values compared, thereby defining the corrected value of the sample within the corrected response signal., wherein said predetermined sampling rate is 10 samples per bit of data.

9. A method for generating a corrected response signal from a corrupted digital response signal comprising the steps of:

receiving a first response signal;

sampling a first response signal at a predetermined sampling rate;

generating a second and a third response signal by shifting said first response signal a predetermined number of samples to the right and by shifting said first response signal a predetermined number of samples to the left respectively;

comparing a sample value of said first response signal to the value of the corresponding sample of said second and third response signals;

determining the corrected value of said sample by a majority decision between said values of said corresponding samples of said first, second and third response signals, thereby generating a corrected response signal;

checking said corrected response signal via a CRC generator to determine the validity of said corrected response signal;

sampling said corrected response per signal sample at a predetermined sampling rate yielding sample values, in response to a determination that said data is invalid;

comparing said value of said first response signal sample to the value of the corresponding sample of said second response signal to the value of the corresponding sample of said corrected response signal;

generating a majority sample value among the three sample values compared, thereby defining a more corrected value of the sample within the corrected response signal.

10. A method according to claim 9 wherein said predetermined sampling rate is 10 samples per bit of data.

11. A method claim according to claim 9, wherein said predetermined number of samples that said first response signal is shifted is two samples.

12. A method for generating a corrected response signal from a corrupted digital response signal comprising the steps of:

receiving first second and third response signals, wherein said first second and third response signals are the same response signal transmitted three times;

sampling said first second and third response signals at a predetermined sampling rate, yielding a sample value per sample;

comparing the value of the corresponding sample of the first signal to the value of the corresponding sample of said second response signal and to the value of the corresponding sample of said third response signal;

generating a majority sample value among the three sample values compared, thereby defining a corrected value of the sample within the corrected response signal;

checking said corrected response signal via a CRC generator to determine the validity of said corrected response signal;

sampling said corrected response signal per sample at a predetermined sampling rate, yielding sample values in response to the data being determined invalid;

generating a second and a third corrected response signal by shifting said corrected response signal a predetermined number of samples to the right and by shifting said corrected response signal a predetermined number of samples to the left respectively;

comparing said values of said samples of said first corrected response signal to the values of said corresponding samples of said second and third corrected response signals;

determining the corrected value of said samples by a majority decision between said first, second and third corrected response signals, thereby generating a more corrected response signal.

13. A method for generating a corrected response signal from a corrupted digital response signal comprising the steps of:

receiving a first received response signal, a second received response signal and a third received response signal;

sampling a first received response signal at a predetermined sampling rate, yielding a sample value per sample;

generating a second and a third response signal by shifting said first received response signal a predetermined number of samples to the right and by shifting said first received response signal a predetermined number of samples to the left respectively;

comparing said sample values of said first received response signal to the value of the corresponding samples of said second and third response signals;

determining the corrected value of said sample by a majority decision between said values of said corresponding samples of said first received, second and third response signals, thereby generating a first corrected response signal, A(x);

checking said corrected response signal via a CRC generator to determine the validity of said corrected response signal;

sampling a second received response signal yielding a sample value per sample, in response to a determination that said data is invalid;

generating another second and another third response signal by shifting said second received response signal a predetermined number of samples to the right and by shifting said second received response signal a predetermined number of samples to the left respectively;

comparing said sample values of said second received response signal to the value of the corresponding samples of said another second and another third response signals;

determining the corrected value of said sample by a majority decision between said values of said corresponding samples of said second received, another second and another third response signals, thereby generating a second corrected response signal, B(x);

checking said second corrected response signal via a CRC generator to determine the validity of said second corrected response signal;

sampling a third received response signal yielding a sample value per sample, in response to a determination that said data is invalid;

generating a third second and a third third response signal by shifting said third received response signal a predetermined number of samples to the right and by shifting said third received response signal a predetermined number of samples to the left respectively:

comparing said sample values of said third received response signal to the value of the corresponding samples of said third second and said third third response signals;

determining the corrected value of said sample by a majority decision between said values of said corresponding samples of said third received, third second and third third response signals, thereby generating a third corrected response signal, C(x);

checking said third corrected response signal via a CRC generator to determine the validity of said third corrected response signal;

comparing said value of said first corrected response signal sample to the value of the corresponding sample of said second corrected response signal to the value of the corresponding sample of said third corrected response signal;

generating a majority sample value among the three sample values compared, thereby defining a more corrected value of the sample within the corrected response signal.

14. A method according to claim 13, wherein said predetermined sampling rate is 10 samples per bit of data.

15. A method according to claim 13, wherein said predetermined number of samples that said first received response signal is shifted is 2 samples.

16. A method according to claim 13, wherein said predetermined number of samples that said second received response signal is shifted is 2 samples.

17. A method according to claim 13, wherein said predetermined number of samples said that said third received response signal is shifted is 2 samples.

* * * * *